(12) United States Patent
Ahn et al.

(10) Patent No.: US 7,970,126 B2
(45) Date of Patent: Jun. 28, 2011

(54) COMMUNICATION TERMINAL WITH MOVABLE DISPLAY

(75) Inventors: Sang Moon Ahn, Gunpo-si (KR); Jong Won Lim, Anyang-si (KR)

(73) Assignee: LG-Ericsson Co., Ltd., Seoul (KR)

( * ) Notice: Subject to any disclaimer, the term of this patent is extended or adjusted under 35 U.S.C. 154(b) by 1074 days.

(21) Appl. No.: 11/546,352

(22) Filed: Oct. 12, 2006

(65) Prior Publication Data

US 2007/0103457 A1    May 10, 2007

(30) Foreign Application Priority Data

Nov. 10, 2005   (KR) ................. 10-2005-0107606

(51) Int. Cl.
*H04M 9/00*   (2006.01)
*H04M 1/00*   (2006.01)

(52) U.S. Cl. .................... 379/428.03; 345/156

(58) Field of Classification Search .............. 379/428.01–428.04, 432, 433.04, 436; 345/156, 345/169; 361/681, 682
See application file for complete search history.

(56) References Cited

U.S. PATENT DOCUMENTS

| | | | | |
|---|---|---|---|---|
| 4,782,522 A * | 11/1988 | Kramer et al. | ................ | 379/368 |
| 5,187,743 A * | 2/1993 | Gumb et al. | ................ | 379/436 |
| 5,347,630 A * | 9/1994 | Ishizawa et al. | ............... | 345/538 |
| 5,661,641 A * | 8/1997 | Shindo | .......................... | 361/814 |
| 5,761,297 A * | 6/1998 | Kingsbury et al. | ...... | 379/428.03 |
| 6,038,311 A * | 3/2000 | Nitobe et al. | ............ | 379/428.03 |
| 6,519,483 B1 * | 2/2003 | Watanabe | ................. | 455/575.1 |
| 6,643,124 B1 * | 11/2003 | Wilk | ........................ | 361/679.04 |
| 6,902,284 B2 * | 6/2005 | Hutzel et al. | ................... | 359/865 |
| 7,012,727 B2 * | 3/2006 | Hutzel et al. | .................. | 359/265 |
| 7,197,139 B2 * | 3/2007 | Templin et al. | ........... | 379/428.04 |
| 7,216,401 B2 * | 5/2007 | Bae | ................................ | 16/324 |
| 2002/0090980 A1 * | 7/2002 | Wilcox et al. | ................. | 455/566 |
| 2006/0050018 A1 * | 3/2006 | Hutzel et al. | .................... | 345/60 |

\* cited by examiner

*Primary Examiner* — Fan Tsang
*Assistant Examiner* — Phylesha Dabney
(74) *Attorney, Agent, or Firm* — KED & Associates, LLP (57) ABSTRACT

A communication terminal equipped with a sliding-type flat display module includes a main body and a flat display which slides between retracted and extended positions along a first axis relative to the main body and which rotates to a tilted position along a second axis when in the extended position. The first axis may be substantially perpendicular to the second axis. In the retracted position, the flat display is unable to rotate to the tilted position along the second axis. Also, in this position, the display is partially visible to allow information to be read by a user while at the same time being protected within a receiving part of the terminal.

17 Claims, 9 Drawing Sheets

COMMUNICATION TERMINAL WITH MOVABLE DISPLAY

BACKGROUND

1. Field

One or more embodiments described herein relate to a communication terminal having a display.

2. Background

A flat display module such as a liquid crystal display (LCD) has garnered much interest as a replacement for existing CRT (Cathode Ray Tube) display devices, principally because LCDs overcome many of the shortcomings of CRT devices. Because of significant improvements that have recently been made, small, light, low-power flat display modules can now be mass produced and used in most communication terminals. However, in spite of their superior performance characteristics, LCDs and other types of flat display modules still have drawbacks.

BRIEF DESCRIPTION OF THE DRAWINGS

The embodiments will be described in detail with reference to the following drawings in which like reference numerals refer to like elements, wherein.

DETAILED DESCRIPTION

Figure 1:
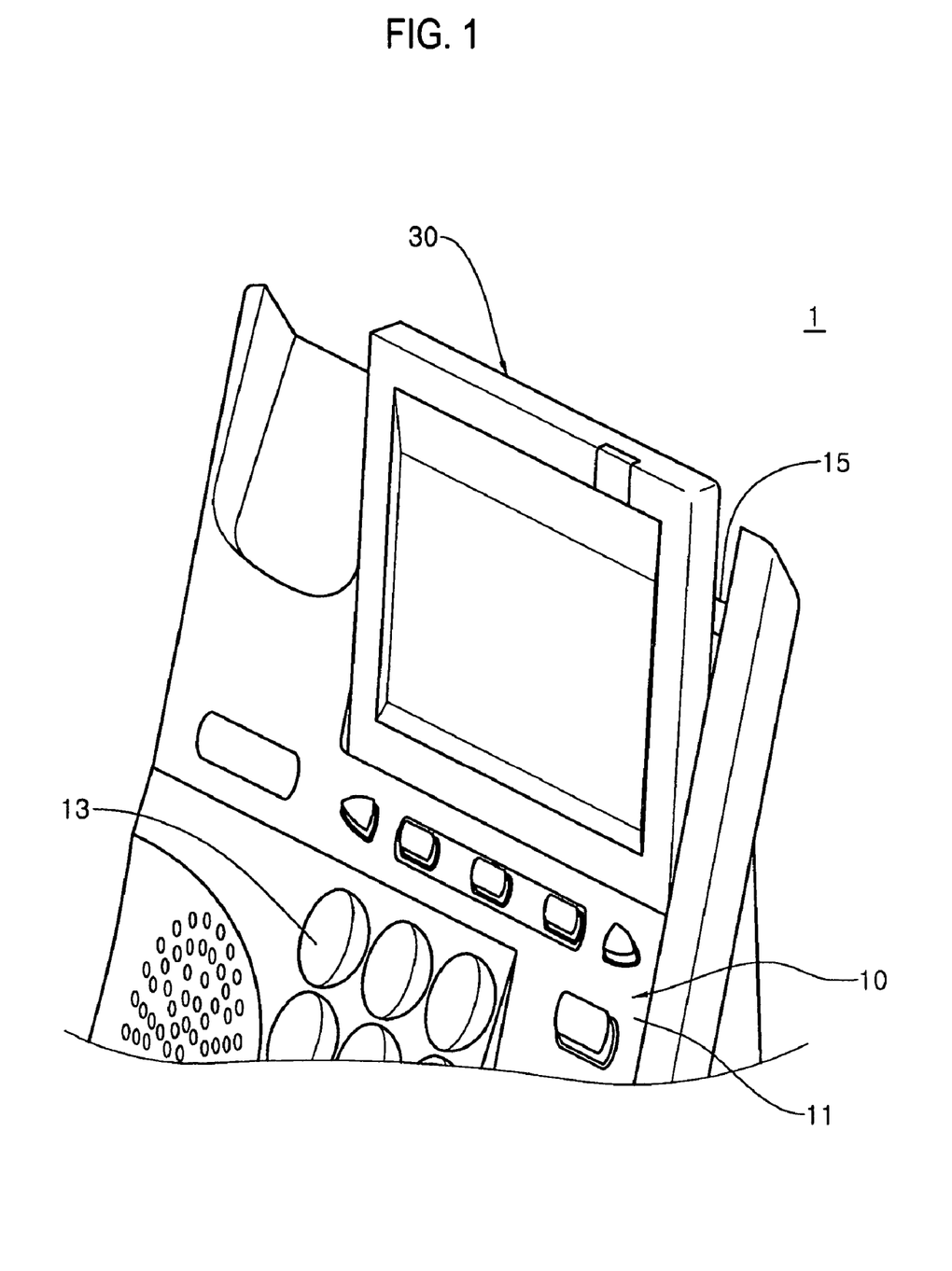
FIG. 1 is a diagram showing one type of communication terminal having a flat display module.
Figure 2:
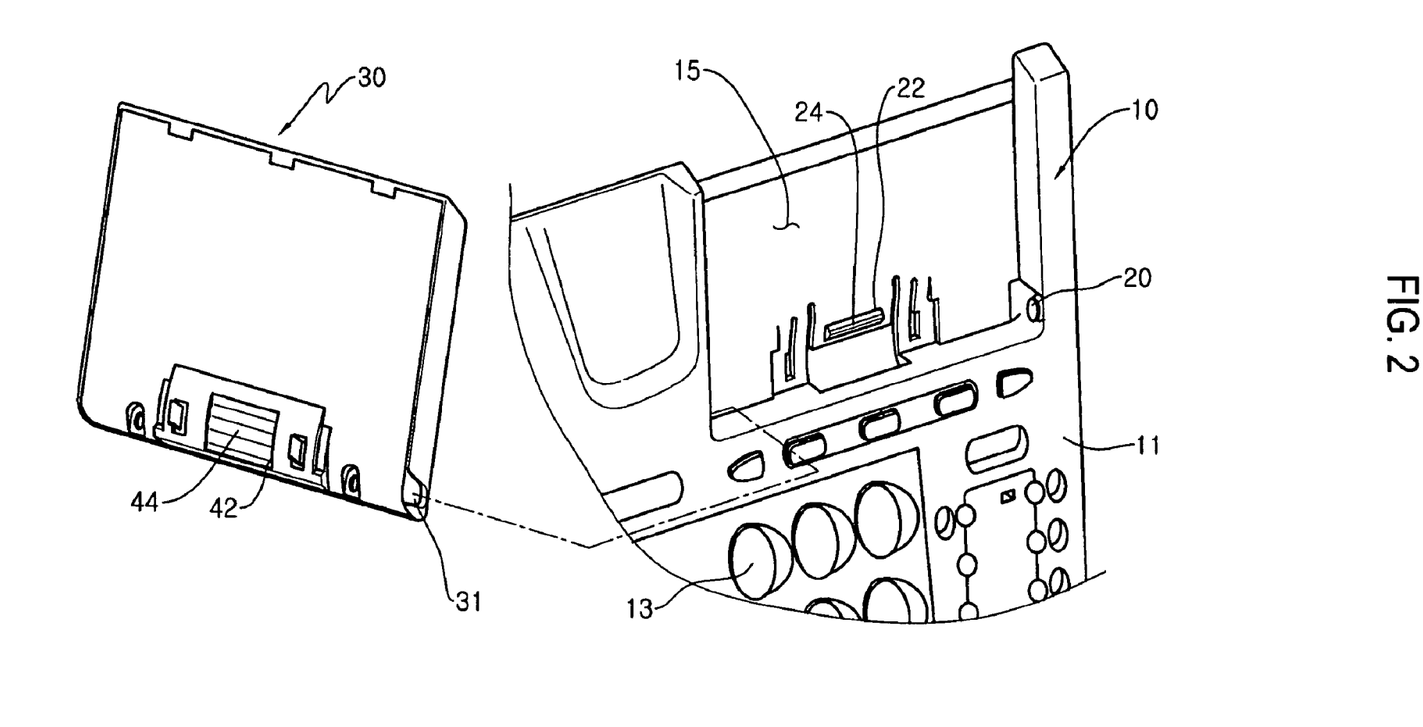
FIG. 2 is a diagram showing a separate view of the flat display module shown in FIG. 1.

FIG. 1 shows one type of communication terminal having a flat display module, and FIG. 2 shows a separated view of the terminal of FIG. 1. As shown in FIG. 1, terminal 1 includes a plurality of keys 13 for inputting information on a front side of a case 11 of a main body 10. The flat display module 30 is installed in the main body. As shown in FIG. 2, the flat display module is installed in such a manner that it can be tilted to an angle that is comfortable for a user to observe the displayed information.

As further shown in FIG. 2, a space 15 is formed outside case 11 of the main body for accommodating the flat display module. Installation grooves 31 are formed at the lower ends of both sides of the flat display module. Also, inside of space 15, rotational axes 20 protrude from points that correspond to the installation grooves. A first protrusion 22, which has the shape of a semicircle pillar, is fixed to a bottom surface of space 15 at about the halfway point of a line extending from the two rotational axes 20. At a circumferential surface of the first protrusion 22, a plurality of raised spots 24 arranged in a longitudinal direction are formed at a predetermined interval.

Further, a second protrusion 42, which preferably is of the same construction as first protrusion 22, is fixed to a rear side of the flat display module 30. When the flat display module is installed in the main body inside space 15, the second protrusion 42 is in contact with the first protrusion 22. In order to insert the rotational axes 20 into the installation groove 31 of this configuration, the flat display module 30 must forcibly be inserted to space 15 of the case.

With the flat display module installed in the main body, the flat display module is tilted to a prescribed angle around the rotational axes by pulling forces exerted onto the flat display module. This allows a user to comfortably watch the screen of the flat display module at a desired tilted angle.

More specifically, the raised spot(s) 44 of the second protrusion 42 goes over the raised spot(s) 24 of the first protrusion by a force applied by the user. The raised spots 24, 44 of the first and second protrusion 22, 42 then interact with each other in such a manner that the flat display module cannot rotate by its weight alone. Thus, the flat display module remains in a tilted position at the prescribed angle (i.e., tilted state). As the flat display module 30 remains in the tilted position, the user can comfortably view the texts and images outputted from the flat display module 30.

Because the flat display module shown in FIGS. 1 and 2 is exposed to the outside environment, it can easily be damaged by external forces. Also, since the entire screen of the flat display module is exposed to the outside environment, text or images are displayed using the entire screen. Because the flat display module displays information using the entire screen, there are problems of unnecessary energy consumption and life shortening effects, even when the flat display module is in a standby mode and even when only a small amount of information needs to be displayed.

Figure 3:
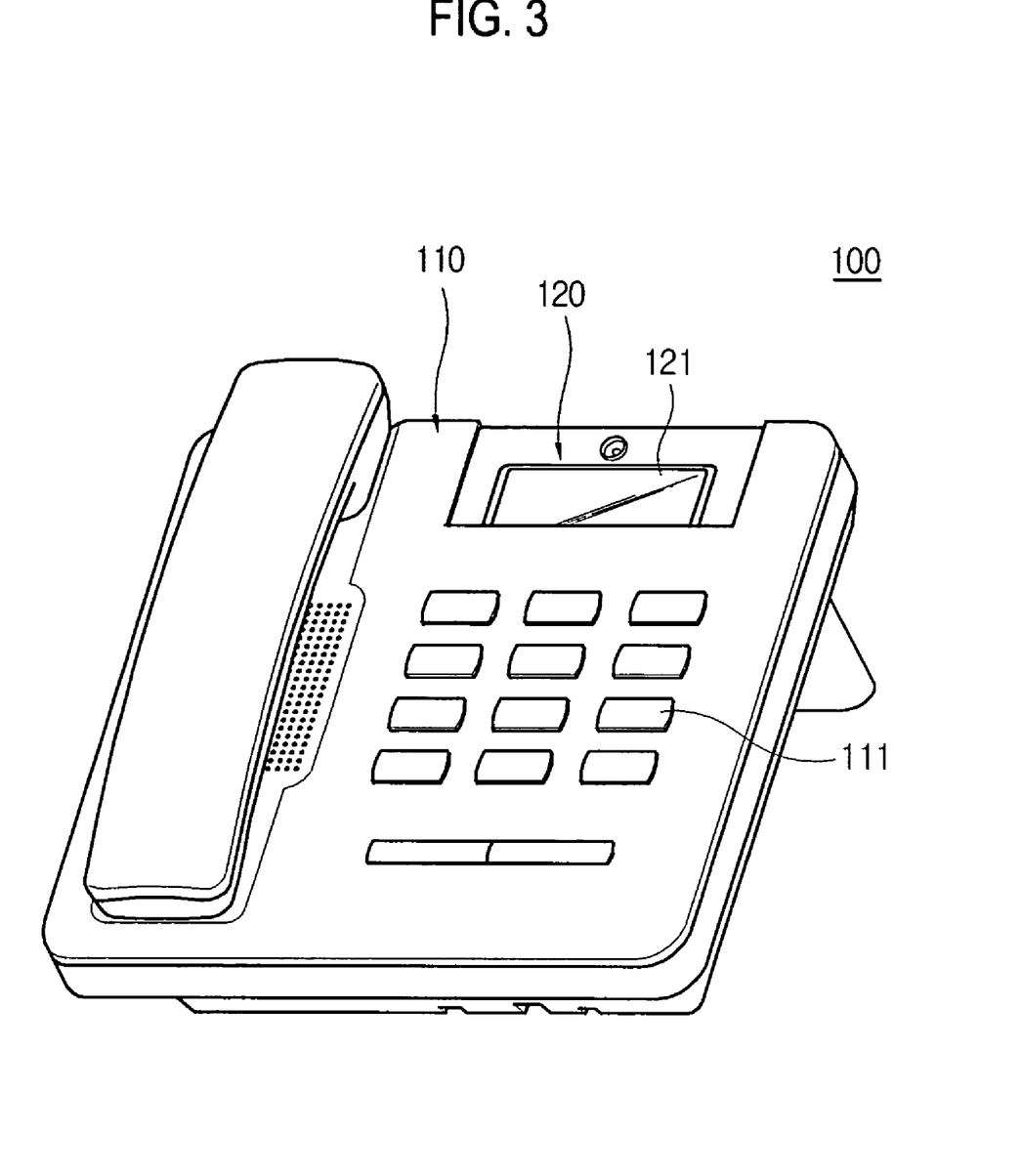
FIG. 3 is a diagram showing a sliding-type flat display module incorporated within a communication terminal.
Figure 4:
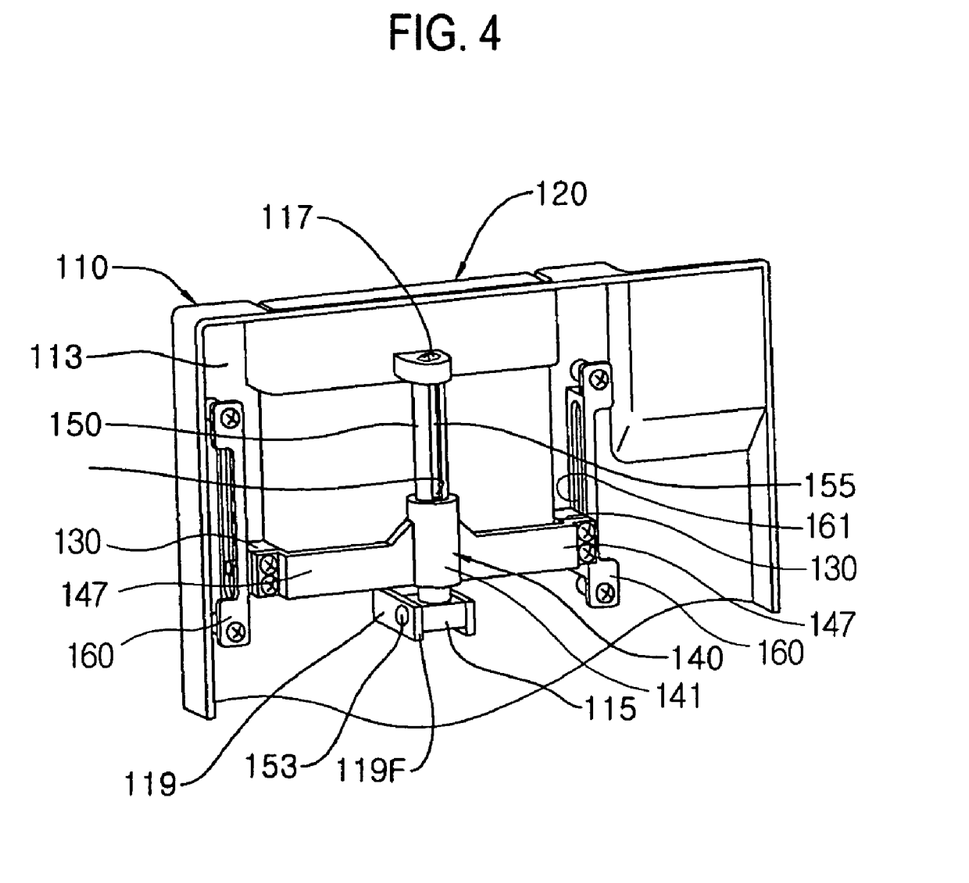
FIG. 4 is a diagram showing the inside of an upper part of a case included in the communication terminal of FIG. 3.

FIG. 3 shows another type of communication terminal 100 having a sliding-type flat display module. FIG. 4 is a partial perspective view showing the inside of the communication terminal shown in FIG. 3. And, FIG. 5 is an exploded perspective view showing sliding parts installed inside of an upper part of the case shown in FIG. 4.

Figure 5:
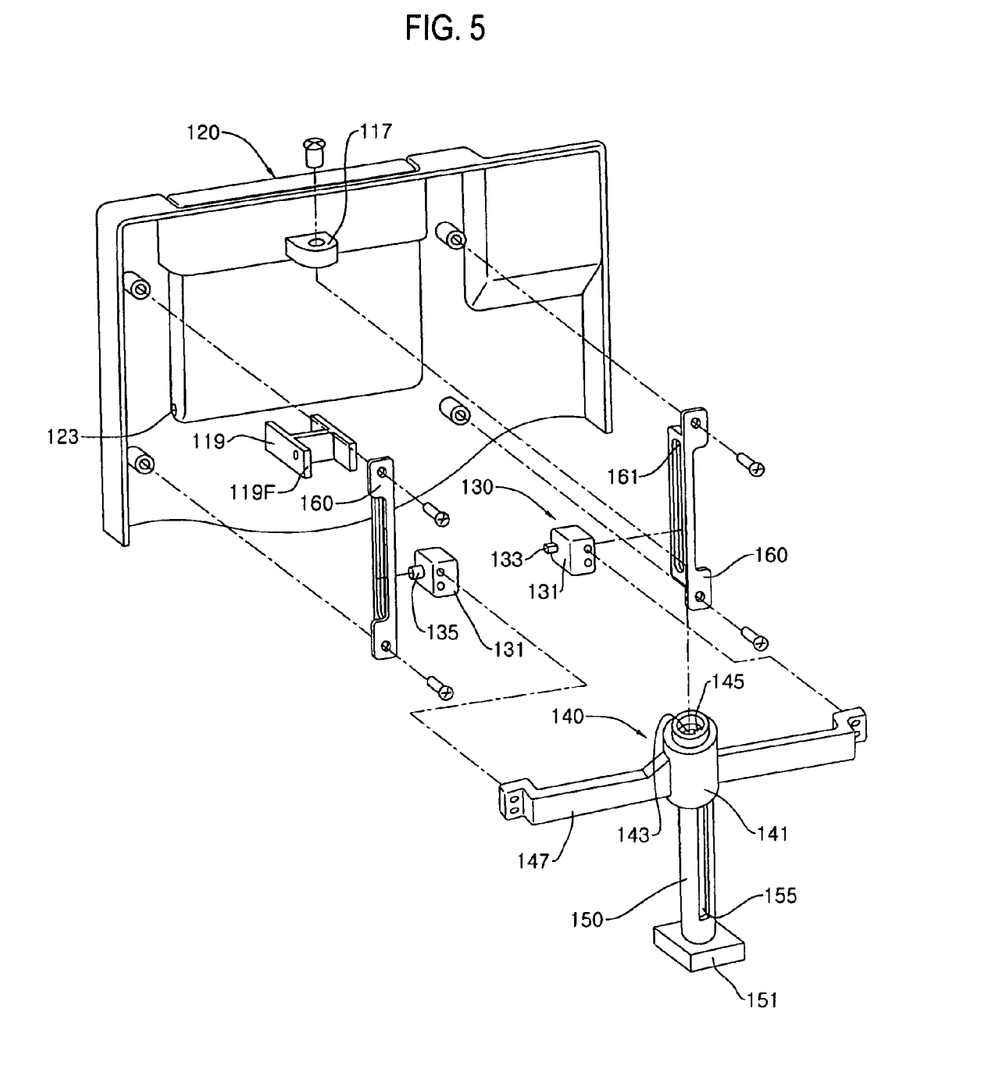
FIG. 5 is a diagram showing an exploded view of sliding parts installed inside of the upper part of the case shown in FIG. 4.

Referring to FIGS. 3 to 5, the communication terminal comprises a main body 110, a plurality of keys 111, a handset, and a flat display module 120. The flat display module is received into a receiving part 115 (see FIG. 7(c)) formed at one side of the main body. The flat display module can be slid outside of the main body to be tilted. The slid-out and tilted flat display module can be laid down and then slid back inside of the receiving part 115 during use.

As shown in FIG. 3, when the flat display module 120 is located inside receiving part 115, a front side of the receiving part is opened to outwardly expose an upper part of a screen 121 of the flat display module. Further, as shown in FIGS. 4 and 5, the following parts are installed inside of a case 113 of the main body: a hinge part 130 hinge-jointed to both sides of a lower end of the flat display module 120, a slider 140 coupled to the hinge part to be slidable along with the flat display module and, first and second rails 150, 160 for guiding the sliding movement of the flat display module.

Corresponding to the receiving part 115, as shown in FIGS. 4 and 5, a holder 117 is formed inside case 113 and is fixed by a bolt, with an upper end of a first rail 150 of preferably a circular cylinder shape inserted thereto. A lower end of first rail 150, which is preferably perpendicularly disposed, is fixed to a bracket 119 formed inside the case 113. More particularly, bracket 119 may have an H shape, with each side of two flanges 119F fixed to the inside of case 113. Then, with a block 151 formed in a lower part of the first rail 150 disposed between the other sides of two flanges 119F, the bolt 153 is fixed. The lower end of first rail 150 may therefore be fixed to bracket 119, and the upper end of the first rail inserted in holder 117 is preferably disposed perpendicularly.

The receiving part may also include a slider 140 having a configuration where a cylinder 141 is formed at its center, with wings 147 formed at both sides of the cylinder 141. The first rail 150 is arranged to go through a center hole 143 of the cylinder 140 of the slider. Thus, the slider 140 moves to slide up and down in a longitudinal direction of the first rail. A key formed inside cylinder 141 may be configured to fit into a key groove 155 formed in the first rail in the longitudinal direction. The slider 140 is therefore only allowed to move up and down along the first rail and does not rotate.

Also, hinge parts 130 are coupled to each wing 147 of the slider 140. The hinge parts 130 are installed at installation grooves 123 formed at both sides of the lower end of the flat display module 120. Hinge part 130 preferably includes: a hinge body 131, a hinge 133 protruding from one side of the hinge body 131 and rotating with respect to the hinge body 131; and a protrusion 135 protruding from the other side opposite of the one side from where the hinge 131 protrudes. The hinges 133 are each inserted and disposed in installation grooves 123 formed at the flat display module 120. At hinge body 131, each of the wings 147 of the slider are coupled. Thus, two hinge parts 130 are coupled to both ends of the slider 140 and simultaneously installed at the installation grooves 123 of the flat display module 123.

The hinge part 130 moves along second rails 160 disposed parallel to first rail 150. The second rails 160 are disposed at each side of wings 147 of the slider, and the protrusion 135 of the hinge part is inserted into a long hole 161 formed in the longitudinal direction of the second rail. Thus, as the flat display module moves by sliding up and down the first rail, hinge part 130 moves up and down with the flat display module and slider. Also, the protrusion moves along the long hole 161 of the second rail and guides the moving direction of the flat display module. Operation of the communication terminal with the sliding-type flat display module will now be discussed in greater detail.

Figure 6A:
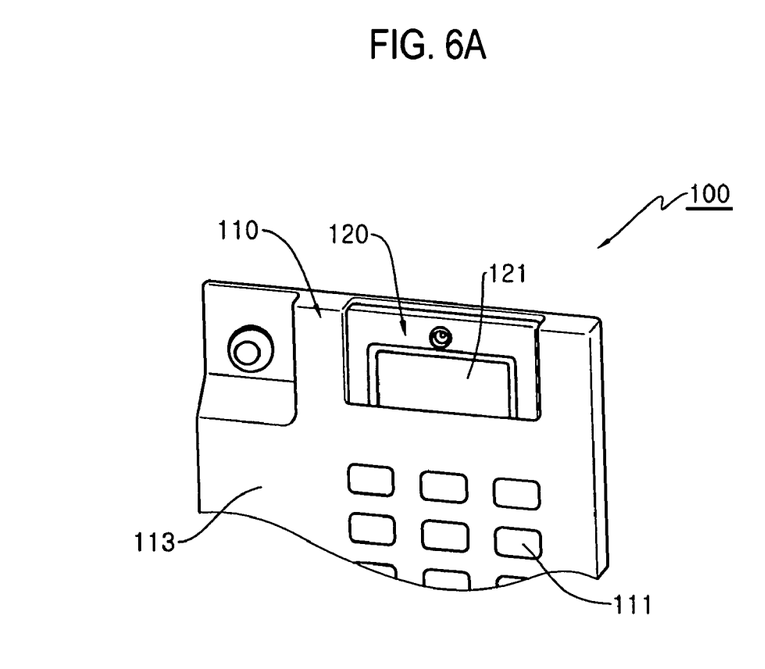
FIGS. 6(a)-6(c) are diagrams showing one way in which the terminal of FIG. 3 may be operated.
Figure 6B:
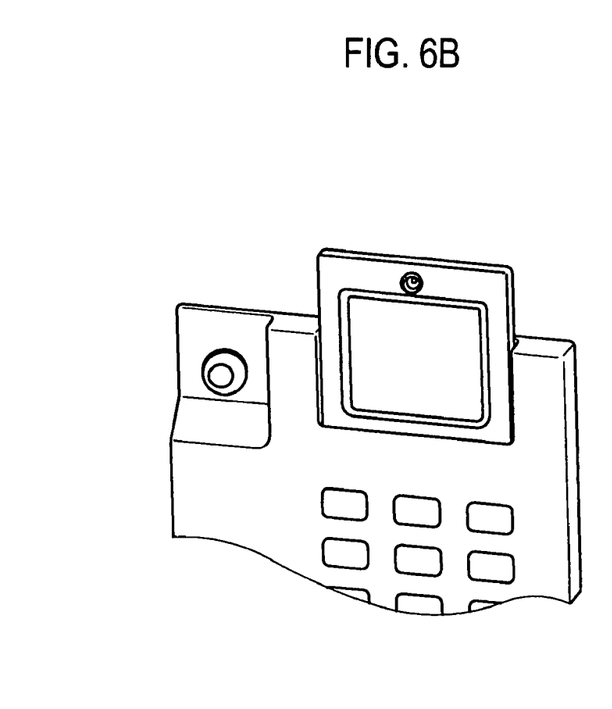
Figure 6C:
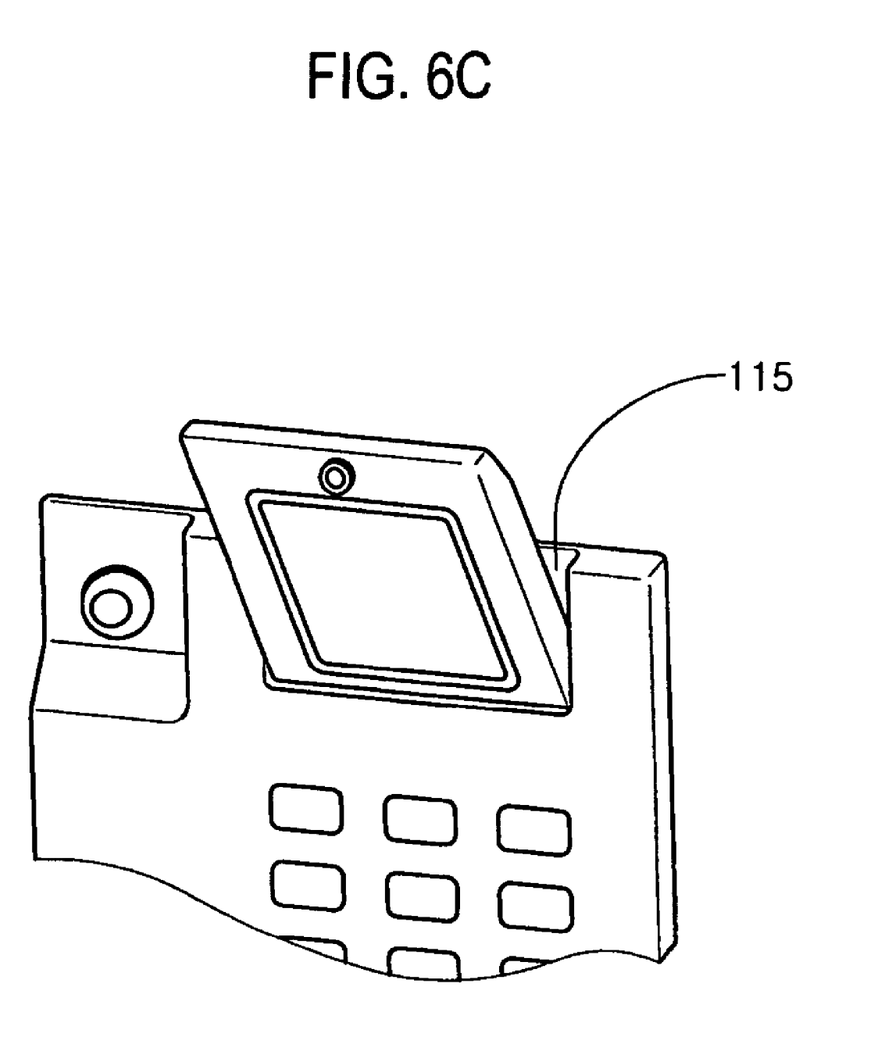
Figure 7A:
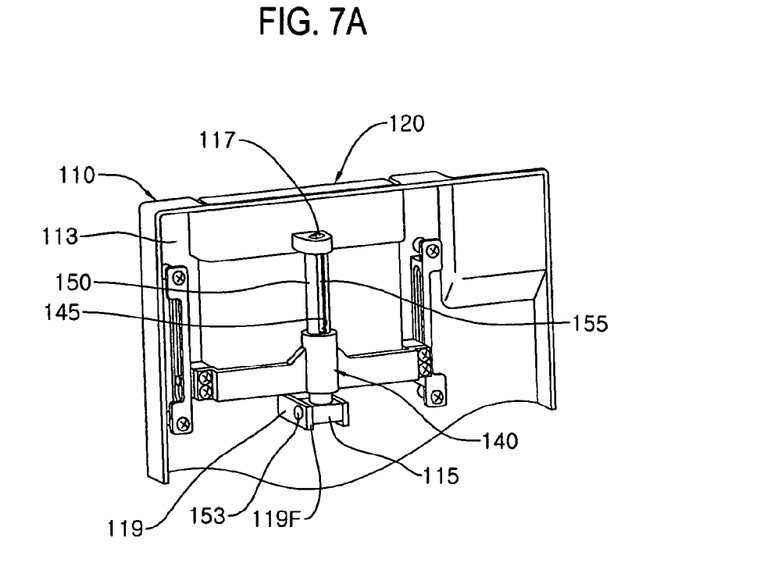
FIGS. 7(a)-7(c) are diagrams showing operation of the sliding parts of the flat display module shown in FIG. 6.
Figure 7B:
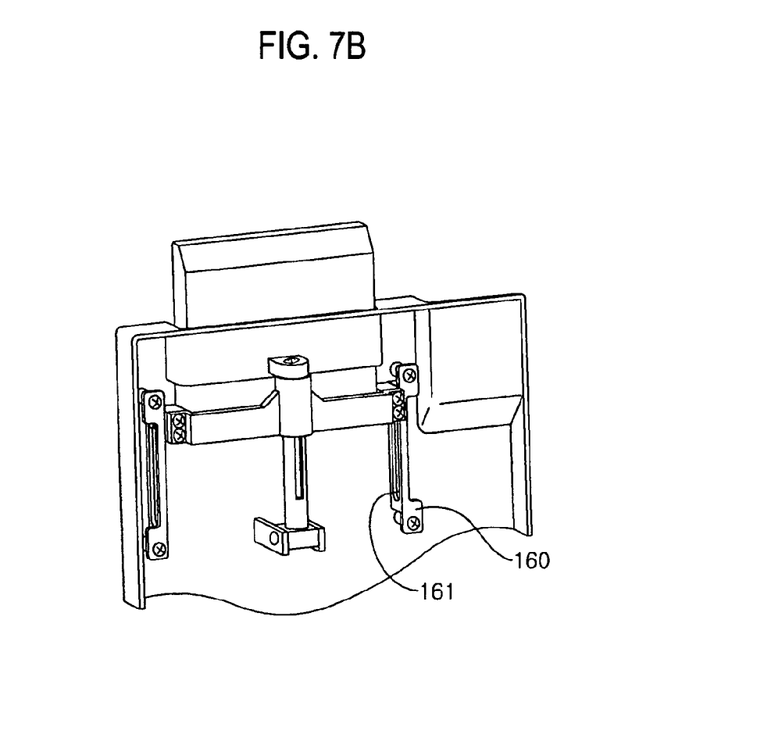
Figure 7C:
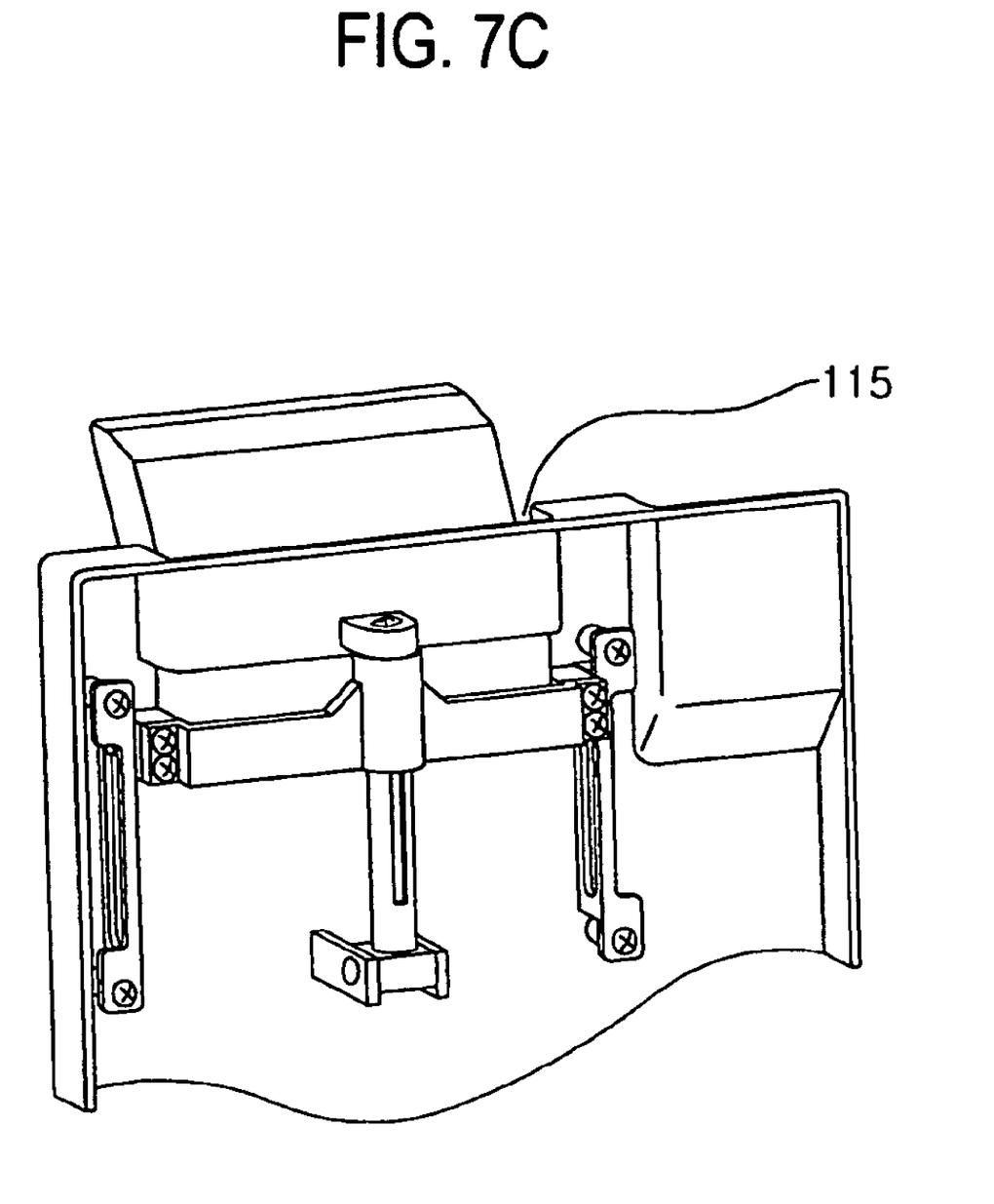

FIGS. 6(*a*)-6(*c*) show an exemplary way in which the communication terminal shown in FIG. 3 may operate, and FIGS. 7(*a*)-7(*c*) show an exemplary operation of the sliding parts of the flat display module shown in FIGS. 6(*a*)-(*c*).

As shown in FIG. 6(*a*), with the flat display module 120 received in the receiving part 115, only a part of an upper end of the flat display module 120 is outwardly exposed. In this state, as shown in FIG. 7(*a*), the slider 140 is located at the lower end of the first rail 150 and the hinge part 130 is also positioned at the lower end of the second rail 160.

When the user pulls the flat display module in an upward direction, as shown in FIGS. 6(*b*) and 7(*b*), the flat display module moves in the upward as a result of slider 140 moving upward along the first rail 150 and hinge part 130 moving upward along long hole 161 of the second rail 160. As slider 140 comes into contact with holder 117, hinge part 130 moves to the highest point of the upper end the long hole 161 of the second rail, where the flat display module can no longer move in the upward direction.

In this state, hinge 133 of hinge part 130 has been moved up to an open part formed in front of the receiving part 115. As a result, the flat display module can rotate with hinge 133 as its center (i.e., the flat display module 120 can be tilted). With the screen 121 of the flat display module 120 totally exposed outside of the case 113, the user may tilt the flat display module 120 to a position where the user can more comfortably view the screen.

When there is no need to view the screen 121 of the flat display module 120, the flat display module in the tilted state is laid down and then pushed back into the receiving part to a position where only the upper end of the screen is exposed, as shown in FIG. 3(*a*). In this position, the flat display module displays texts and images only through the exposed portion. Here, the hinge does not get tilted by the weight of the flat display module. Preferably, the hinge is a free stop hinge that can withstand the weight of the flat display module and maintain the angle of the flat display module when the no force is applied by the user.

In the aforementioned terminal, the hinge part 130 installed in the flat display module has been described as moving in upward and downward directions along first and second rails 150, 160. However, in alternative embodiments, the flat display module can move without one of the first and second rails 150, 160. That is, the level of performance of the display module may be achieved even when the flat display module is installed to a hinge part which is only coupled to the first rail 150 or a hinge part that only moves along the long hole 161 of the second rail 160. Therefore, the first rail 150 and the second rail(s) 160 may both perform the same function in this embodiment.

The communication terminal with the sliding-type flat display module therefore is advantageous in that it allows a user to tilt the flat display module to a prescribed angle to comfortably view text and images displayed on its screen. The communication terminal also has another advantage where the user can insert the flat display module into the receiving part when the user does not desire to watch the screen, thereby preventing the module from being damaged by external forces.

The communication terminal also has another advantage where a part of the case is opened to outwardly expose only a portion of the upper end of the flat display module in its retracted position, such that the text and images are only displayed through an exposed portion of the screen. Therefore, since only a portion of the screen is used to display text and images, energy consumption is minimized and the lifespan of the flat display module is prolonged.

Thus, in accordance with one embodiment, a communication terminal with a flat display module is disposed inside a case of a main body to prevent the flat display module from being damaged by an outside force. The communication terminal exposes only a portion of the flat display module when in a standby mode. Thus, it displays texts or images through only the exposed portion of the screen of the display module, thereby saving power and prolonging the life of the flat display module.

In accordance with another embodiment, a sliding-type communication terminal with a flat display module includes a flat display module; a main body with a receiving part formed at one side such that said flat display module is received therein and can be further withdrawn therefrom; at least one rail disposed inside of a case of the main body and installed in a moving direction of the flat display module; and at least one hinge part hinge-jointed to the flat display module and coupled to the rail to thereby move along the rail.

Preferably, the hinge part is coupled to the lower end of one side of the flat display module. Further, the flat display module rotates around the hinge part without interfering with the case when the hinge part arrives at the uppermost end of the rail.

Also, the hinge part may include a hinge body, a hinge formed at one side of the hinge body to thereby be coupled with the flat display module, and a protrusion protruding from the other side of the hinge body to thereby be coupled with the rail. The rail may include a long hole formed in a longitudinal direction to insert the protrusion therein.

The communication terminal may also include a slider coupled to the hinge part for movement along the rail and inside the case. An upper end of the rail may be inserted into a holder formed inside the receiving part and a lower end of the rail may be fixed to a bracket formed in a side of the case.

The slider may include a center hole formed for the rail to penetrate therethrough, a wing extending from a side of the slider and fixed to the hinge part, and a key protruding from the center hole to thereby be inserted to a key groove formed in a longitudinal direction of the rail. The receiving part may be opened at a part of the front of the receiving part to expose a part of the flat display module to an outside of the case when the flat display module is received into the receiving part.

In accordance with another embodiment, a flat display module includes a main body having a receiving part wherein the receiving part receives the flat display module; and a supporting part adapted to support one end of the flat display module for rectilinear and rotary motions between first and second positions of the flat display module with respect to the main body. At the first position, the flat display module may be received in the receiving part, and at the second position a front side of the flat display module may be exposed.

The supporting means may include at least one rail installed in proximity of the receiving part, at least one hinge part hinge-jointed to one end of the flat display module and coupled to the rail to thereby move along the rail. The flat display module may further include a standby mode display area, where the display area is outwardly exposed when the flat display module is in the first position.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A communication terminal, comprising:
    a main body; and
    a flat display which slides between retracted and extended positions along a first axis relative to the main body and which rotates to a tilted position along a second axis when in the extended position, wherein a screen of the flat display is only partially visible when in the retracted position, said partially visible portion of the screen displaying information to a user in the retracted position, and wherein:
    the main body includes a recess to receive the flat display when in the retracted position, said recess opening along a predetermined side of the main body,
    the terminal further comprises at least one hinge coupled to a first rail,
    the flat display slides along the first rail in a direction coincident with the first axis when moving between the extended and retracted positions, and
    the hinge allows the flat display to rotate to the tilted position along the second axis when the display is in the extended position.

2. The communication terminal of claim 1, wherein the first axis is substantially perpendicular to the second axis.

3. The communication terminal of claim 1, wherein the flat display is unable to rotate to the tilted position along the second axis in the retracted position.

4. The communication terminal of claim 1, wherein said information includes text and images.

5. The communication terminal of claim 1, wherein the hinge allows the display to tilt in a direction toward a user and away from the main body when the display is in the extended position.

6. The communication terminal of claim 1,
    wherein the screen of the flat display is only partially visible when in the retracted position, only said partially visible portion of the screen displaying information to a user in the retracted position, and wherein remaining portions of the flat display screen are not used to display information in the retracted position.

7. The communication terminal of claim 1, wherein the communication terminal is a desk phone.

8. A communication terminal, comprising:
    a main body; and
    a flat display which slides between retracted and extended positions along a first axis relative to the main body and which rotates to a tilted position along a second axis when in the extended position, wherein a screen of the flat display is only partially visible when in the retracted position, said partially visible portion of the screen displaying information to a user in the retracted position,
    wherein the main body includes a recess which receives the flat display when in the retracted position, said recess opening along a predetermined side of the main body,
    wherein the terminal further comprises a first rail,
    wherein the flat display slides along the first rail in a direction coincident with the first axis when moving between the extended and retracted positions, and
    wherein the hinge slides along the first rail when the flat display moves between the extended and retracted positions.

9. The communication terminal of claim 8, wherein the hinge includes a protrusion which slides along a hole in the first rail when the flat display moves between the extended and retracted positions.

10. The communication terminal of claim 8, further comprising:
    a slider which is coupled to the hinge and which slides along the first rail with the hinge.

11. The communication terminal of claim 10, wherein the slider moves along a second rail parallel to the first rail, the slider including: a key which is inserted into a groove of the second rail, wherein the key slides within the groove when the flat display slides between the extended and retracted positions.

12. A flat display module, comprising:
    a screen; and
    a supporting member to support one end of the screen, wherein the supporting member slides the screen between retracted and extended positions along a first axis and allows the screen to rotate to a tilted position along a second axis when in the extended position, wherein the screen is only partially visible when in the retracted position, a portion of said partially visible screen displaying information to a user in the retracted position, wherein the supporting member includes a slider which slides along a rail in a direction coincident with the first axis when the screen moves between the extended and retracted positions, and wherein the flat display module further comprises: at least one hinge coupled to the rail, wherein the hinge allows the screen to rotate to the tilted position along the second axis when in the extended position.

13. The flat display module of claim 12, wherein the first axis is substantially perpendicular to the second axis.

14. The flat display module of claim 12, wherein the supporting member is unable to rotate the screen to the tilted position along the second axis in the retracted position.

15. The communication terminal of claim 12, wherein the hinge allows the screen to tilt without allowing the support member to tilt.

16. A communication terminal comprising:
a main body; and
a flat display which slides between retracted and extended positions along a first axis relative to the main body and which rotates to a tilted position along a second axis when in the extended position, wherein a screen of the flat display is only partially visible when in the retracted position, said partially visible portion of the screen displaying information to a user in the retracted position, the terminal further comprising:
a pair of first rails;
a second rails between the first rails; and
a slider coupled to the flat display and moving along the first and pair of second rails between the extended and retracted positions, the slider including:
a first part coupled to the second rail,
wings coupled to either side of the first part, and
protrusions coupled to respective ones of the wings and sliding along respective ones of the first rails.

17. The communication terminal of claim 16, wherein the protrusions rotate relative to the first rails to allow the flat display to rotate to said tilted position along said second axis.

* * * * *